United States Patent [19]

Whittemore

[11] Patent Number: 5,079,332
[45] Date of Patent: Jan. 7, 1992

[54] FAST CURING PHENOLIC RESIN FOR MAKING PLYWOOD

[75] Inventor: Charles Whittemore, Albany, Oreg.

[73] Assignee: Georgia-Pacific Resins, Inc., Atlanta, Ga.

[21] Appl. No.: 338,615

[22] Filed: Apr. 17, 1989

[51] Int. Cl.$^5$ .................. C08G 8/08; C08G 14/04
[52] U.S. Cl. .................................................. 528/147
[58] Field of Search ........................................ 528/147

[56] References Cited

U.S. PATENT DOCUMENTS

| | | | |
|---|---|---|---|
| 1,919,163 | 7/1933 | Jackson et al. | 528/147 |
| 2,218,373 | 10/1940 | Alexander | 528/147 |
| 2,315,400 | 3/1943 | D'Aielio | 260/45 |
| 2,676,898 | 4/1954 | Folger et al. | 117/126 |
| 2,910,484 | 10/1959 | de Stevens | 528/147 |
| 3,929,695 | 4/1975 | Murata et al. | 156/335 |
| 3,998,906 | 12/1976 | Rice et al. | 525/501 |
| 4,176,106 | 11/1979 | Reid et al. | 528/147 |
| 4,239,577 | 12/1980 | Hartman et al. | 156/335 |
| 4,412,945 | 11/1983 | Takahashi et al. | 252/536 |
| 4,539,338 | 9/1985 | Carlson et al. | 521/131 |
| 4,758,478 | 7/1988 | Daisy et al. | 528/147 |

FOREIGN PATENT DOCUMENTS

| | | |
|---|---|---|
| 1009780 | 5/1977 | Canada . |
| 2009474 | 2/1970 | Fed. Rep. of Germany . |
| 54-37195 | 3/1979 | Japan . |
| 55-123644 | 9/1980 | Japan . |
| 6707318 | 5/1976 | South Africa . |
| 396071 | 8/1933 | United Kingdom . |
| 1467410 | 3/1977 | United Kingdom . |

Primary Examiner—John Kight, III
Assistant Examiner—Kathryne E. Shelborne
Attorney, Agent, or Firm—Banner, Birch, McKie & Beckett

[57] ABSTRACT

A phenol-formaldehyde resole resin solution useful in adhesives for preparing wood laminates from a plurality of wood veneers, prepared by reacting at least an equal molar amount of formaldehyde with phenol in the presence of sodium hydroxide and a water-soluble potassium salt selected from the group consisting of potassium chloride, potassium sulfate and mixtures thereof.

15 Claims, 3 Drawing Sheets

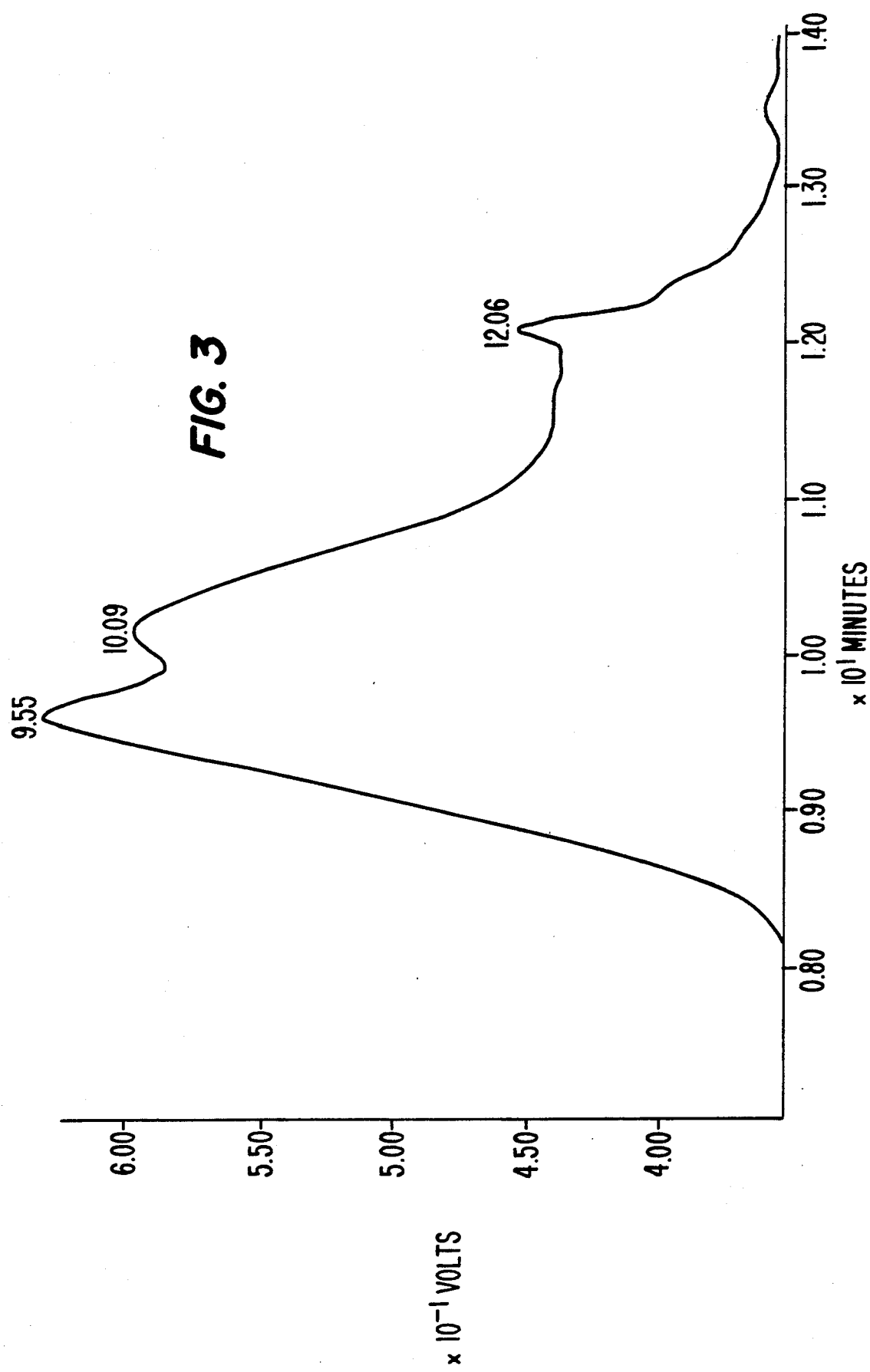

FAST CURING PHENOLIC RESIN FOR MAKING PLYWOOD

BACKGROUND OF THE INVENTION

1. Field of the Invention

This invention broadly relates to an improved phenolic resin composition useful in adhesives for making composite wood products, particularly plywood. The invention also relates to a process for making plywood.

2. Description of Related Art

Phenolic resin-based adhesives are well-known for their exceptional strength and durability. Such resins have achieved wide spread acceptance in the United States and elsewhere as the principal component of adhesives used in making wood laminates such as plywood, particularly for exterior exposure. Phenolic resins for use in such adhesives generally are prepared by condensing phenol with a molar excess of formaldehyde under alkaline reaction conditions. The resulting resins, typically referred to as resoles, are thermosetting polymers or oligomers.

For producing plywood, the adhesive is applied to the mating surfaces of wood veneers and the veneers are subjected to a pressing operation at an elevated temperature to consolidate them into a unitary panel and to cure the adhesive. Often, the pressing is performed in two stages to maximize output; using a first or pre-press stage at ambient temperature and under a pressure and for a time just sufficient to consolidate the veneers into a unitary panel. The consolidated panel can be stored and handled without shifting or separation of the veneers and afterwards can be treated under heat and pressure to cure the thermosetting adhesive and form the final laminate.

One recognized draw back of conventional phenol-formaldehyde resins is their slow rate of cure.

In preparing wood laminates such as plywood with such adhesives, it has long been conventional to dry the wood veneers to a very low moisture content, i.e., to less than about 5% average moisture content (5 lbs. water/100 lbs. dry wood), before application of the adhesive and consolidation of the veneers. Use of high moisture content veneers with adhesives formulated with conventional phenolic resins invariably leads to a large number of lamination defects and an excessively large number of rejected panels because of poor lamination.

Many lamination defects are believed to be caused by steam formation between veneer layers and a blow out of the steam when pressure is released upon completion of the pressing cycle. As the temperature increases in the center of the veneers during consolidation, so does the vapor pressure of trapped steam. As the press is opened, the built-up vapor or steam seeks an avenue of escape and blows the panel.

Sizable operating and capital costs have been incurred in the prior art to assure consistently low moisture content for wood veneers used in making wood laminates such as plywood, and thus eliminate lamination defects and reduce the number of rejected panels. The prior art, however, has recognized the advantages to be gained in both operating and capital costs if higher moisture content veneers could be employed in the preparation of wood laminates, and the plywood industry recently has increased its efforts to identify adhesives suitable for bonding higher moisture content veneers.

In U.S. Pat. No. 4,239,577, for example, a process is described for preparing wood laminates from high moisture content wood veneers. In accordance with this process, panels are prepared using veneers of differing moisture contents with higher moisture content veneers constituting the outer layers of the consolidated panel and lower moisture content veneers constituting the panel core. While this process purports to ameliorate problems encountered when using high moisture content veneers with adhesives formulated with conventional phenolic resins, it does not eliminate the need for drying at least some of the veneers to a low moisture content.

In U.S. Pat. No. 4,412,945, an adhesive is described which purportedly permits the preparation of wood laminates using high moisture content veneers. The adhesive composition combines a phenol-aldehyde resin, an alkaline catalyst and from 5-50%, based on the weight of resin solids, of a bentonite clay. The adhesive also may contain other conventional additives such as fillers and extenders. Apparently, this adhesive has not received widespread acceptance in the plywood industry, which continues to search for ways to reduce substantially the need to dry high moisture content veneers before assembling them into unitary wood laminates.

Reduced veneer drying requirements result in savings in capital costs and processing time and also lead to improvements in the dimensional stability of the consolidated wood laminates. Conventional laminates made with veneers having less than about 5% moisture content tend to swell in size as the moisture content of the wood laminate increases to its equilibrium content gradually with time. In the summer months, the equilibrium moisture content of a wood laminate may be as high as about 10% by wt. Finally, the ability to prepare laminates using high moisture content veneers, e.g. about 7 wt. % and higher, also relaxes the criticality of moisture control in veneer preparation.

Through the years, various other modifications also have been proposed for producing phenol-formaldehyde resins which exhibit a faster cure rate without sacrificing bond strength and quality. Such resins might be better suited for bonding veneer of higher moisture content. Thus, the prior art has employed the use of more reactive phenols such as resorcinol, reactive additives such as formamide, or the addition of various cure rate accelerators such as potassium carbonate, just prior to use. Unfortunately, these approaches have not succeeded for a variety of reasons, including increased costs, inconvenience, and health and safety considerations.

Daisy et al. U.S. Pat. No. 4,758,478 indicates that by replacing at least a part of the sodium hydroxide commonly used to prepare phenol-formaldehyde condensates, with potassium hydroxide, a faster curing resin is obtained. The patent further asserts that such a potassium-modified resole resin exhibits improved cure speed without any loss in rheological properties. Consequently, reduced adhesive spreads are possible and it is possible to use such resins to prepare adhesives for making plywood from veneers of increased moisture content.

Unfortunately, potassium hydroxide is a more expensive source of alkalinity than sodium hydroxide and thus such resins are more expensive than their conventional counterparts. Thus, there remains a need in the art for methods for modifying conventional phenol-formaldehyde resins to provide a more economical, faster curing resin suitable for bonding veneers with higher average moisture contents.

Applicant has found that it is possible to prepare a faster curing and moisture tolerant resole resin, while using sodium hydroxide to supply all of the alkalinity for preparing the phenolic resin, as has commonly been done in preparing phenol-formaldehyde resole resins, by also using a small amount of certain water-soluble potassium salts selected from the group consisting of potassium chloride, potassium sulfate and mixtures thereof. Quite surprisingly, the molecular weight distribution of such a potassium salt-modified phenolic resin is strikingly similar to resins prepared by using a combination of potassium hydroxide and sodium hydroxide.

Thus, resins of the present invention exhibit similar properties to those prepared using a combination of sodium hydroxide and potassium hydroxide but are much more economical due to the significantly lower cost for the water-soluble potassium salt additives and the typically lower amount of such salts which are required to obtain desirable resin properties relative to the amount of potassium hydroxide needed to obtain a similar resin. Resins of the present invention are particularly suitable for preparing adhesives used for making plywood, particularly plywood made from veneers having a relatively high average moisture content.

BRIEF DESCRIPTION OF THE DRAWINGS

FIGS. 1 through 3 show the gel permeation chromatography (GPC) traces for resins prepared in accordance with Examples 1 and 2 and Comparative Example 1, respectively.

DESCRIPTION OF THE INVENTION

Figure 1:
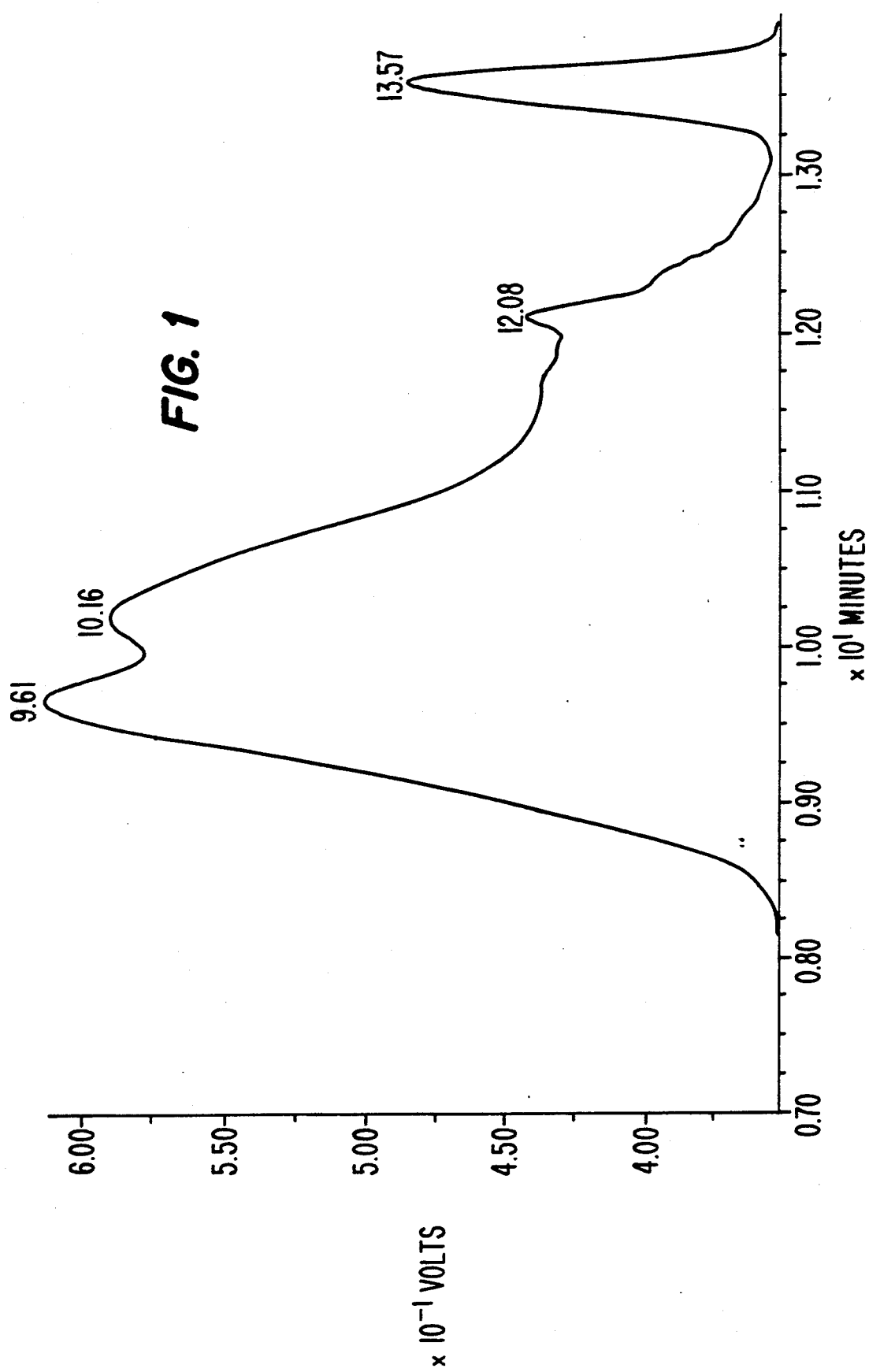

The present invention is directed to a potassium salt-modified phenol-formaldehyde resole resin useful in adhesives for bonding cellulosic products, particularly for preparing plywood. The present invention also is directed to adhesives prepared from such resins, the method of bonding cellulosic materials using such adhesives and the resultant cellulosic composites. The resin has particular utility for making plywood adhesives used to bond veneers of relatively high average moisture content.

The phenol-formaldehyde resins of the present invention are commonly referred to as resoles and constitute thermosetting condensation products produced by reacting at least an equal molar amount of formaldehyde with phenol. Particularly preferred phenol-formaldehyde condensation products are prepared using a molar ratio of phenol to aldehyde in the range of about 1:1.5 to 1:3 with a phenol to formaldehyde molar ratio of about 1:2 being particularly preferred.

In preparing resins according to the present invention, formaldehyde is reacted with phenol in an aqueous reaction medium in the presence of the alkaline catalyst. Sodium hydroxide is the alkaline catalyst of choice in the present invention.

A variety of techniques are known in the art for reacting phenol and formaldehyde in the presence of the alkaline catalyst. Typically, the resin is reacted in stages with separate partial additions of either one or both of the reactants and the alkaline catalyst. For example, one common procedure is to react the phenol with a portion of the formaldehyde, in the presence of a portion of the alkaline catalyst. After a brief, initial exothermic reaction, additional amounts of alkaline catalyst and formaldehyde are added to the reacting mixture and the reaction is continued with careful control of the reaction temperature. Once all of the reactants and catalyst have been added, the reaction is allowed to proceed to a suitable end point, which may be determined by measuring the refractive index of the reacting mixture or by measuring the viscosity of the reacting mixture of by some combination thereof as recognized by those skilled in the art. Once the selected end point is achieved, the reaction mixture is cooled and the resin is ready for preparing an adhesive mixture.

An amount of sodium hydroxide is added during the preparation of the resin to produce a resole resin solution having an alkalinity content, i.e. an amount of alkaline catalyst, in the range of about 1% to about 15%, preferably about 3% to about 9%, and most preferably about 4% to about 8% based on the weight of the resole resin solution. As used herein alkalinity content means the content of alkaline catalyst expressed as a percent of a solution according to the equivalent weight of sodium hydroxide. Normally, from about 50 mol % of sodium hydroxide up to about 100 mol % of sodium hydroxide based on the mols of phenol used in preparing the resole resin will provide the desired level of alkalinity. Preferably about 0.60 mol to about 0.80 mol of sodium hydroxide per mol of phenol is used.

Preferably, hydroxybenzene (phenol) is the phenol reactant of choice, although substituted phenols such as cresol and higher functional phenols such as resorcinol or bisphenol-A, can be used. Formaldehyde is the preferred aldehyde constituent. Generally, the formaldehyde is supplied as an aqueous solution known in the art as "formalin". Formalin generally contains from about 37% to about 50% by weight formaldehyde. Other forms of formaldehyde such as paraformaldehyde also can be used. Other aldehydes, which may be used in lieu of or in combination with formaldehyde, include aliphatic aldehydes such as acetaldehyde and propionaldehyde; aromatic aldehydes such as benzylaldehyde and furfural and other aldehydes such as aldol, glyoxal and crotonaldehyde.

In accordance with the present invention, a water-soluble potassium salt selected from the group consisting of potassium chloride, potassium sulfate and mixtures thereof is included at some point during the preparation of the resole resin. For convenience, the potassium salt is one of the ingredients present when reaction conditions are established. Generally, resins according to the present invention are prepared by adding from about 1 mol % up to about 25 mol %, preferably from about 3 mol % up to about 20 mol %, and most preferably from about 5 mol % up to about 15 mol % of potassium via use of a potassium salt selected from the group consisting of potassium chloride, potassium sulfate and mixtures thereof based on the mols of phenol used in preparing the resole resin. Higher levels of potassium addition do not appear to improve the properties of the resins sufficiently to justify the additional costs; whereas at lower levels of potassium addition the beneficial impact from using the water soluble potassium salt is lessened. In general, at least about 3 mol % of potassium based on the molar amount of phenol used in preparing the resin, is included to produce a noticeable enhancement in the resin's of properties relative to a resole resin prepared using only sodium hydroxide. Amounts above about 20 mol % based on the moles of phenol used, is generally not advisable because any improvement in performance typically does not keep pace with the added costs.

Not all water-soluble potassium salts can be used to obtain the results of the present invention. Some salts, such as those formed by reaction of a strong base (e.g. KOH) and a weak acid (e.g. $H_2CO_3$), provide an undesired buffering capacity to the reaction mixture that necessitates higher levels of caustic addition. Potassium carbonate also tends to have an adverse affect on resole solution stability, even at low addition levels. Other water-soluble salts, such as potassium nitrate and potassium permanganate, are strong oxidizing agents and adversely affect the plywood adhesive composition.

For plywood preparation, the resin prepared in accordance with the present invention typically exhibits a number average molecular weight in the range of about 3,000 to 5,000 and a weight average molecular weight of about 25,000 to 50,000. The resin's polydispersity is preferably between about 7 and 14. Preferably, the resin exhibits a number average molecular weight in the range of about 3,700 to 4,500 and more preferably from about 4,000 to 4,300, and exhibits a polydiperisity of between about 8 to 12.

The process of making the potassium-modified resole resin of the present invention is directly adaptable to equipment conventionally used for making phenol-formaldehyde resole resins. As noted above, the reaction is conducted in aqueous solution. Normally, the reaction is conducted so that the ultimate resole resin has a non-volatile material (NVM) content of at least about 35% by weight based on the weight of the resole resin solution. NVM contents of up to about 55–60% are possible, although it is preferred that the NVM content not exceed about 50% in order to avoid solutions that have such high viscosities that they present problems in mixing and pumping. Preferably, resole resin solutions useful in preparing adhesives for making plywood have an NVM content of between about 40% and 48% by weight, and more preferably between about 40% and 44% by weight.

In using the resole resin of the present invention for preparing a wood composite such as plywood, it is common to blend the resin with additional ingredients to prepare the actual adhesive. In addition to the resin solution itself, which constitutes the major component of the adhesive mixture (generally from about 40 to 80% by weight of the adhesive), it is common to include various fillers, i.e. inert materials added to increase the weight of the adhesive mixture, adhesive extenders, additional caustic and other known adjuvants. Generally, a suitable adhesive will contain from about 23 to 32% resin solids, from about 3 to 7% fillers, from about 3 to 7% extenders and from about 1 to 3% additional alkaline catalysts. Suitable fillers and extenders include starch, wood, flour, nut shell flour, bark products or agricultural residues, clays, and corn husks. Starch and clays generally are used as fillers, often in amounts of 1% to 10% based on the weight of the resin solids. On a water-free basis the adhesive generally contains about 55 to 75% resin solids.

In accordance with one process of the present invention, an adhesive mixture is applied to the mating surface of a plurality of wood plys. The amount of adhesive normally depends on the characteristics of the veneer to be bonded and the properties desired in the consolidated panel. The adhesive is applied to the plys generally in an amount of between about 40 to 130 and more preferably in an amount of about 60 to 120 pounds per 1000 square feet of double glue line. The application rates typically will differ with different wood sources. For example southern pine which has a higher absorbancy capacity than western veneers such as Douglas Fir, requires greater adhesive spreads.

The adhesive mix can be applied to the wood using conventional equipment, including spray nozzles, atomizing wheels, roll coaters, curtain coaters, foam applicators and the like.

The various plys are assembled into a panel and generally are consolidated at an ambient temperature, i.e., at a temperature of from about 15° to 30° C., and at a pressure sufficient merely to assemble the plys into a coherent article. Generally, a pressure in the range of about 25 to 400 pounds per square inch is suitable. The plys are subjected to such pressure until a sufficient initial pre-pressed bond is obtained to keep the plys from separating or coming apart upon release of the pressure. A bond of the required strength usually is obtained with a contact time in the range of about 30 seconds to 20 minutes.

After this initial consolidation, the pressure on the panels is released and they are stored until they are consolidated at an elevated temperature at which the adhesive resin cures. The use of the two step pressing procedure permits easy handling and assembly line type operation. For the final press, the panels are typically consolidated at a temperature within the range of about 90° to 200° C. and at pressures of about 75 to 250 pounds per square inch. The panels are subjected to these press conditions for a time sufficient to cure the adhesive, which for a normal panel construction will require anywhere from about 1 to about 20 minutes.

A wide variety of woods can be used for making plywood in accordance with the present invention. Suitable woods include, soft woods such as Southern pine, Douglas Fir, Ponderosa pine, aspen and the like, as well as hard woods such as oak, walnut and birch.

A particular advantage of the present invention is that the adhesive can be used for gluing high average moisture content veneers with reduced blowouts and other moisture induced defects. By using an adhesive according to the present invention, plywood can be prepared from a plurality of veneers having an average moisture content of greater than about 7% and up to about 12% and higher, with spots of moisture as high as 15–20%. Usually, veneer average moisture content is targeted for about 5% up to about 10%.

Other advantages claimed for resins prepared by using a combination of sodium hydroxide and potassium hydroxide are similarly realized with the resin of this invention, which has the additional advantage of lower cost.

The following examples are presented to illustrate and explain the invention. Unless otherwise indicated, all references to parts and percentages are based on weight and all temperatures are expressed in degrees Celsius.

EXAMPLE 1

This example describes a method of preparing a phenol-formaldehyde resole resin component of an adhesive useful in practicing the method of the present invention which employs potassium chloride as the water-soluble potassium salt.

The following ingredients are added to a jacketed reaction vessel equipped with a mixer: about 24 parts phenol, about 2.3 parts potassium chloride and about 27 parts water. During the addition of these ingredients, the contents of the reaction vessel are heated to about 60° C. About 3.2 parts of a 50% by weight sodium hydroxide solution then is rapidly added to the reaction mixture, while maintaining the temperature at no greater than about 60° C. Reflux conditions are established and about 31 parts by weight of a 50% by weight aqueous formaldehyde solution is added into the reaction mixture over a 20 to 30 minute time period. The temperature of the reaction mixture is maintained at about 60° C., using cooling water if required. Once the formaldehyde has been added, the reaction mixture is heated rapidly to about 96° C. and held at that temperature for about 15 minutes. Thereafter the reaction mixture is cooled to about 89° C. and about 5.4 parts of a 50% by weight aqueous sodium hydroxide solution is rapidly added. The solution is permitted to react at this temperature until the reaction mixture reaches a Gardner-Holdt viscosity of about "G". The reaction mixture is cooled to about 80° C. and held for an additional period of time until the reaction mixture reaches a Gardner-Hold viscosity of about "T". A third addition of 50% by weight aqueous sodium hydroxide solution in an amount of about 6.1 parts, then is made and the reaction mixture is held at about 80° C. until it attains a Gardner-Holdt viscosity of about T-U. The reaction mixture then is cooled rapidly to less than about 30° C.

The resulting aqueous resin solution typically has a nonvolatile material content of about 43% by weight, and an alkalinity of about 7.4%. Analysis of the resulting resin by gel permeation chromatography using a 1,000/5 weight ratio dimethyl formamide (DMF) to ammonium formate solvent and polyethylene and polyethylene glycol standards indicated a weight average molecular weight of about 35,000 and a number average molecular weight of about 3,800, corresponding to a polydispersity of about 9. A chromatogram of this resin is illustrated in FIG. 1.

EXAMPLE 2

This example describes a method of preparing a phenol-formaldehyde resole resin component of an adhesive useful in practicing the method of the present invention wherein potassium sulfate is the water-soluble potassium salt.

The following ingredients are added to a jacketed reaction vessel equipped with a mixer: about 23 parts phenol, about 2.7 parts potassium sulfate and about 28 parts water. The mixture is heated to a temperature of about 60° C. During the heating, about 2.8 parts of a 50% by weight aqueous solution of sodium hydroxide is added rapidly to the reaction mixture. When the temperature of the reaction mixture reaches about 60° C., about 30 parts of a 50% by weight aqueous formaldehyde solution is added to the reaction mixture over a period of about 20 to 30 minutes. Reflux conditions are established and the temperature is maintained at about 60° C., using cooling water if required. Once the formaldehyde addition is complete, the reaction mixture is heated rapidly to about 96° C. and held at that temperature for about 15 minutes. The reaction mixture then is cooled to about 90° C. and about 5.9 parts of the 50% by weight aqueous sodium hydroxide solution is added rapidly while controlling the temperature of the reaction mixture at about 90° C. The reaction mixture is held at that temperature for an additional period of time to allow it to reach a Gardner-Holdt viscosity of about "G". The reaction mixture then is cooled to about 81° C. and held until it attains a Gardner-Holdt viscosity of about "T". At that time, an additional 6.2 parts of 50% by weight aqueous sodium hydroxide solution is added to the reaction mixture, which is allowed to increase in temperature to about 89° C. The reaction mixture is held at that temperature until it attains a Gardner-Holdt viscosity of about "T-U" and thereafter the reaction mixture is cooled rapidly to less than about 30° C.

Figure 2:
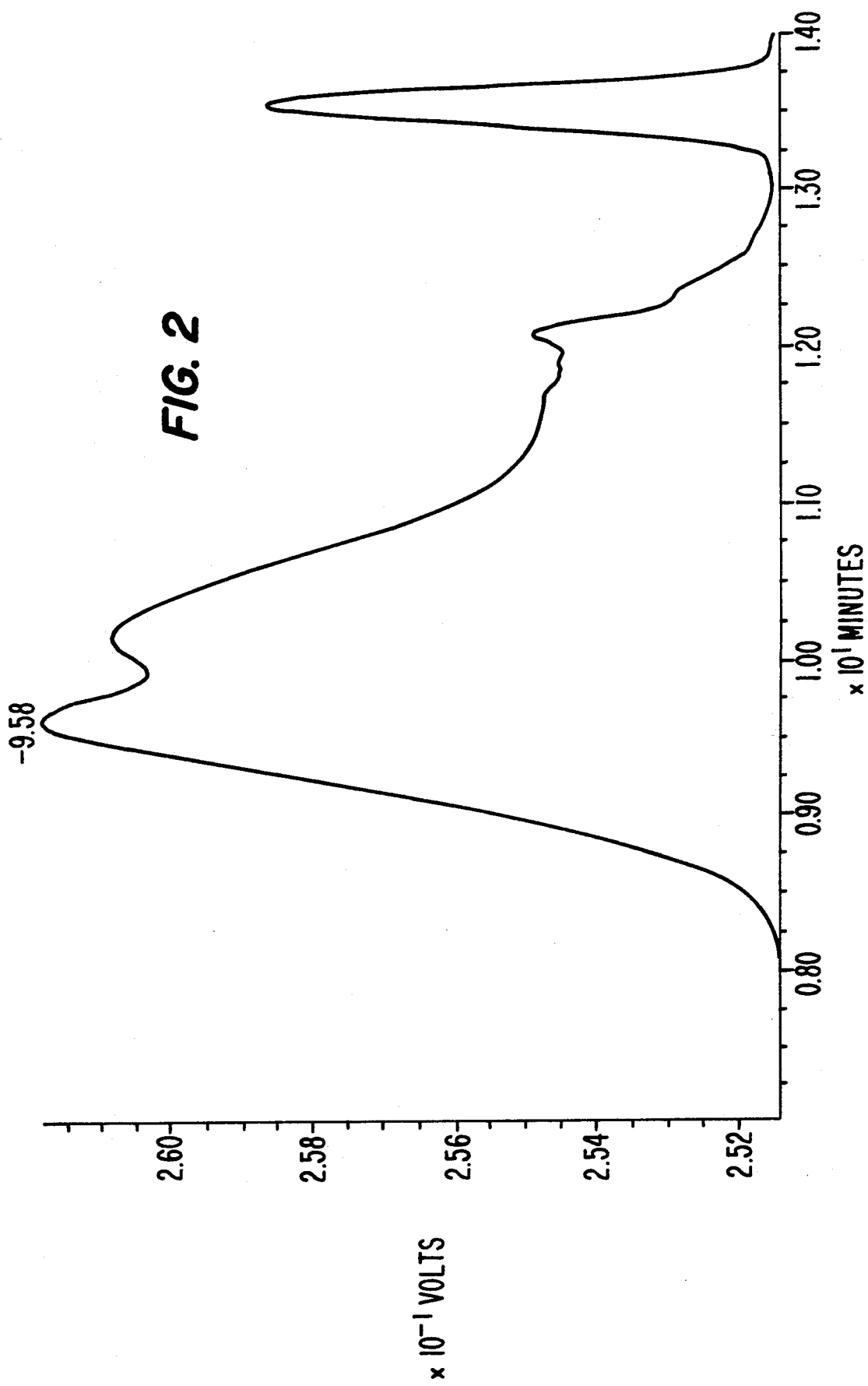

The aqueous resole resin solution typically has a nonvolatile material content of about 43% by weight and an alkalinity of about 7.4%. Analysis of the resulting resin by gel permeation chromatography using the same solvent and standards used in the analysis of the Example 1 resole resin indicated a weight average molecular weight of about 37,000 and a number average molecular weight of about 4,000, corresponding to a polydispersity of about 9. A chromatogram is illustrated in FIG. 2.

EXAMPLE 3

This example describes the use of the aqueous phenol-formaldehyde resole resin solution of Example 1 for preparing an adhesive and using that adhesive for making plywood.

A plywood adhesive was prepared by blending about 20 parts by weight water with about 3.6 parts of Modal extender, about 4 parts wheat flour and about 25 parts of the resole resin solution of Example 1. After through mixing, about 2.1 parts of additional Modal extender and 1.5 parts of a paper coating clay is added. After further mixing, about 2.7 parts of a 50% by weight aqueous sodium hydroxide solution, 0.8 part of sodium carbonate and a small amount of borax is added. Finally, an additional 39.4 parts of the resole resin of Example 1 is added to complete the adhesive.

This adhesive was used to glue ⅛-inch thick Douglas Fir veneer having an average moisture content of about 8 to 12%. The adhesive was applied to the veneer by a spray line at an application level of about 62 to 72 lbs. per 1,000 square feet of double glueline. Three-ply panels were prepared. The consolidated veneer panels were pre-pressed at ambient temperature for about 4½ minutes at 160 psia. Thereafter, the pre-pressed panels were hot pressed at about 157° C. and 175 psia for about one minute and then at about 157° C. and 125 psia to cure the adhesive. The consolidated boards were hot stacked for about 4–8 hours and afterwards were subjected to vacuum-pressure testing in accordance with the American Plywood Association (APA) procedure for measuring wood failure. Eight randomly sampled panels were tested. The tested panels exhibited an average wood failure of about 86%. A high wood failure indicates improved bond strength, since lower wood failures are indicative of a high incidence of glueline failure.

COMPARATIVE EXAMPLE 1

This example illustrates the preparation of an aqueous resole resin solution by reacting phenol and formaldehyde at a mol ratio (P:F) of about 1:2.05 in the presence of an alkaline catalyst mixture of sodium hydroxide and potassium hydroxide.

The following ingredients are added to a jacketed reaction vessel equipped with a mixer: about 24.8 parts of phenol and about 25 parts of water. The contents of the reactor are heated to about 40° C. and about 6.7 parts of a 45% by weight aqueous potassium hydroxide solution is added over a time period of about 15 minutes while the reaction mixture is heated to about 60° C. About 32.4 parts of a 50% by weight aqueous formaldehyde solution then is added slowly into the reaction mixture over about a 30 minute period while maintaining the temperature of the reaction mixture at about 60° C. Thereafter, the reaction mixture is rapidly heated to about 96° C. and reacted for about 15 minutes. The reaction mixture is cooled to about 80° C. over about a 10 minute time period and an additional 2.6 parts of the 45% by weight aqueous potassium hydroxide solution is added rapidly. Thereafter, about 2.9 parts of a 50% by weight aqueous sodium hydroxide solution is rapidly added while allowing the reaction mixture to increase in temperature to about 90° C. The reaction mixture is held at 90° C. until it attains a Gardner-Holdt viscosity of about "R-S". An additional 5.1 parts of a 50% by weight aqueous sodium hydroxide solution is added to the reaction mixture while cooling it to 85° C. The reaction mixture is held at 85° C. until it attains a Gardner-Holdt viscosity of about "S". The reaction mixture then is rapidly cooled to below 40° C.

The resulting resin has a nonvolatile material content of about 43% by weight and an alkalinity of about 7.4%. Analysis of the resin by gel permeation chromatography using the same solvent and standards used in the analysis of the Example 1 resole resin indicated that the resin had a weight average molecular weight of about 42,000 and a number average molecular weight of about 4,100 corresponding to a polydispersity of about 10. FIG. 3 illustrates a chromatogram of this resin.

Comparing the results of Examples 1 and 2 and Comparative Example 1, it is evident that a phenol-formaldehyde resole resin having substantially the same molecular distribution is obtained using only about 12 mol % potassium, based on mols of phenol, when the teachings of the present invention are employed (i.e. when using a water-soluble potassium salt), while about 28 mol % potassium, based on mols of phenol, is required when using potassium hydroxide as the potassium source, i.e. over twice as much potassium.

While certain specific embodiments of the invention have been described with particularly herein, it will be recognized that various modifications thereof will occur to those skilled in the art and it is to be understood that such modifications and variations are to be included within the preview of this application and the spirit and scope of the appended claims.

I claim:

1. An aqueous phenol-formaldehyde resole resin solution prepared by reacting at least an equal molar amount of formaldehyde with phenol in the presence of (i) sufficient sodium hydroxide to provide a final resin solution alkalinity of between about 1 to 15%, and (ii) between about 0.01 to 0.25 mol potassium per mol of phenol, wherein said potassium is added as a water-soluble potassium salt selected from the group consisting of potassium chloride, potassium sulfate and mixtures thereof.

2. The resole resin of claim 1 wherein said phenol and formaldehyde are reacted in a molar ratio of phenol to formaldehyde in the range of about 1:1.5 to about 1:3, said final resin alkalinity is between about 3 to 9% and about 0.03 to 0.2 mol potassium per mol of phenol is present.

3. The resole resin of claim 2 wherein said potassium is present in an amount between about 0.05 to 0.15 mol of potassium per mol of phenol.

4. The resole resin of claim 3 wherein said final resin alkalinity is between about 4% to 8%.

5. The resole resin of claim 4 having a non-volatile material (NVM) content of between about 40 and 48% by weight.

6. In a process for making an aqueous phenol-formaldehyde resole resin solution by reacting at least an equal molar amount of formaldehyde with phenol in the presence of sufficient sodium hydroxide to provide a final resin alkalinity of between about 1 to 15%, the improvement which comprises conducting at least part of said reaction in the presence of between about 0.01 to 0.25 mol potassium per mol of phenol, wherein said potassium is added as a water-soluble potassium salt selected from the group consisting of potassium chloride, potassium sulfate and mixtures thereof.

7. The process of claim 6 wherein said phenol and formaldehyde are reacted in a molar ratio of phenol to formaldehyde in the range of about 1:1.5 to about 1:3, said final resin alkalinity is between about 3 to 9% and about 0.03 to 0.2 mol potassium per mol of phenol is present.

8. The process of claim 7 wherein said potassium is present in an amount between about 0.05 to 0.5 mol of potassium per mol of phenol.

9. The process of claim 8 wherein said final resin alkalinity is between about 4% to 8%.

10. The process of claim 9 wherein said aqueous resole resin solution has a non-volatile material content of between about 40 and 48% by weight.

11. An adhesive composition suitable for making plywood comprising between about 40 to 80% by weight of the aqueous resole resin of solution of claim 5.

12. The resole resin of claim 1 having a non-volatile material (NVM) content of between about 40 and 48% by weight.

13. An adhesive composition suitable for preparing a wood composite comprising between about 40 to 80% by weight of the aqueous resole resin solution of claim 12.

14. The resole resin of claim 2 having a non-volatile material (NVM) content of between about 40 and 48% by weight.

15. An adhesive composition suitable for preparing a wood composite comprising between about 40 to 80% by weight of the resole resin of claim 14.

* * * * *